(12) United States Patent
Johnson

(10) Patent No.: US 10,001,933 B1
(45) Date of Patent: Jun. 19, 2018

(54) OFFLOAD PIPELINE FOR DATA COPYING

(71) Applicant: Amazon Technologies, Inc., Seattle, WA (US)

(72) Inventor: Robert Michael Johnson, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 219 days.

(21) Appl. No.: 14/748,133

(22) Filed: Jun. 23, 2015

(51) Int. Cl.
*G06F 12/00* (2006.01)
*G06F 3/06* (2006.01)
*G06F 13/38* (2006.01)
*G06F 9/54* (2006.01)

(52) U.S. Cl.
CPC ............ *G06F 3/0619* (2013.01); *G06F 3/065* (2013.01); *G06F 3/0665* (2013.01); *G06F 3/0689* (2013.01); *G06F 13/382* (2013.01); *G06F 9/544* (2013.01)

(58) Field of Classification Search
CPC .... G06F 3/0619; G06F 3/0689; G06F 3/0665; G06F 3/065; G06F 13/382; G06F 9/544
USPC ........................................................ 711/114
See application file for complete search history.

(56) References Cited

U.S. PATENT DOCUMENTS

| | | |
|---|---|---|
| 2003/0236851 A1 | 12/2003 | Cuddihy et al. |
| 2005/0256972 A1 | 11/2005 | Cochran et al. |
| 2007/0005833 A1 | 1/2007 | Seto et al. |
| 2011/0219208 A1* | 9/2011 | Asaad ................ G06F 15/76 712/12 |
| 2012/0317390 A1 | 12/2012 | Bickelman et al. |
| 2013/0232378 A1 | 9/2013 | Resch et al. |
| 2013/0339600 A1 | 12/2013 | Shah |
| 2014/0007189 A1 | 1/2014 | Huynh et al. |
| 2014/0115228 A1 | 4/2014 | Zhou et al. |
| 2014/0189380 A1 | 7/2014 | Colpo et al. |
| 2014/0244866 A1 | 8/2014 | Manula et al. |
| 2015/0381491 A1 | 12/2015 | Graham et al. |

OTHER PUBLICATIONS

U.S. Appl. No. 14/673,466, filed Mar. 30, 2015, Titled: Offload Pipeline for Data Mirroring.
U.S. Appl. No. 14/748,131, filed Jun. 23, 2015, Titled: Offload Pipeline for Data Mirroring or Data Striping for a Server.

* cited by examiner

*Primary Examiner* — Mardochee Chery
(74) *Attorney, Agent, or Firm* — Kilpatrick Townsend & Stockton LLP

(57) ABSTRACT

A host device can offload certain copy operations to an I/O adapter device coupled to the host device. The I/O adapter device can perform a copy operation to copy data from a source storage volume to a destination storage volume. The source storage volume and the destination storage volume can be local or remote to the I/O adapter device. The copy operations can be performed for replica creation, online migration or for copy-on-write snapshots.

20 Claims, 8 Drawing Sheets

OFFLOAD PIPELINE FOR DATA COPYING

BACKGROUND

Computers often perform copy operations to copy a portion of data from one storage device to another storage device. For example, computers may perform copy operations for back up, storage or any other tasks. Computers often include a host device and one or more input/output (I/O) devices. For example, a computer may include one or more I/O adapter devices for communicating with the storage devices.

Typically, a host processor in the host device may perform a copy operation to copy a data block from a first storage device to a second storage device. In some instances, the host processor may communicate with an I/O adapter device using a Peripheral Component Interconnect Express (PCIe) interface for reading the data from a storage device or storing the data in a storage device. For example, the host processor may read the data block to be copied from the first storage device via the PCIe interface and store it in a host memory. The host processor may then read the data block from the host memory and write it into the second storage device via the PCIe interface. Moving the data over the PCIe bus may consume lot of resources, e.g., host memory bandwidth and as well as the bandwidth between the host device and the I/O adapter device, which can slow down the performance of the host processor for other important tasks thus reducing the throughput of the system.

BRIEF DESCRIPTION OF THE DRAWINGS

Various embodiments in accordance with the present disclosure will be described with reference to the drawings, in which.

DETAILED DESCRIPTION

Figure 1:
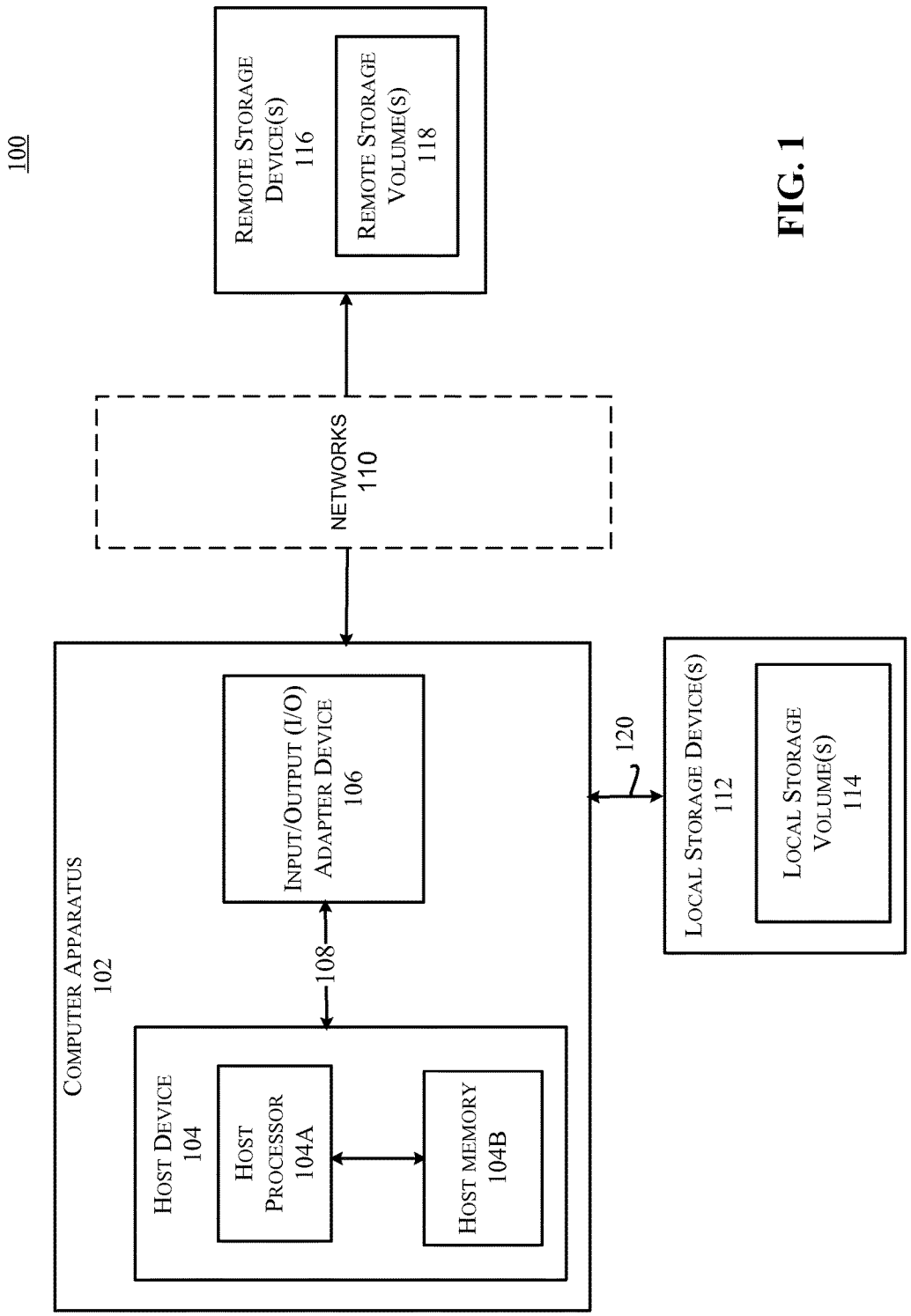
FIG. 1 illustrates a system comprising a computer apparatus coupled to one or more local storage devices and to one or more remote storage devices.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computers often perform copy operations to copy data from one storage volume to another storage volume for various purposes e.g., back up, storage, etc. For example, the storage volumes may be associated with different storage devices that may be local or remote to the computer. Generally, a computer can include a host device and one or more input/output (I/O) devices. For example, a computer may include one or more I/O adapter devices for communicating with the storage devices. The host device may be coupled to the I/O adapter device using a Peripheral Component Interconnect Express (PCIe) interface. In some instances, a host processor in the host device may initiate a copy command to copy a data block from a first storage volume to a second storage volume. For example, the host processor may read said data block from the first storage volume and store it in a host memory (e.g., a DRAM). The host processor may then read the said data block from the host memory and write it into the second storage volume. In some instances, the host processor may communicate with the I/O adopter device using the PCIe interface for reading the data from a storage device into the host memory or storing the data in a storage device from the host memory. Moving the data over the PCIe bus to and from the host memory may consume a lot of resources, e.g., host memory bandwidth as well as the bandwidth between the host device and the I/O adapter device, which can slow down the performance of the host processor for other important tasks thus reducing the system throughput. In some instances, the host processor may initiate a copy operation and hand over the data transfer for the copy operation to a DMA (Direct Memory Access) engine to transfer the data block from the first storage volume to the second storage volume. This method may reduce the host processor overhead but may still consume the host memory bandwidth and may not provide efficient use of the host memory resources.

Various embodiments of the disclosed technologies can allow a host device to offload processing of data to an I/O adapter device. For example, in one embodiment, the host device can offload processing of data from a storage volume to generate and store one or more copies of the data to an I/O adapter device. In another embodiment, the host device can offload processing of the data to generate and store snapshot data for a storage volume to an I/O adapter device. For example, the snapshot data for the storage volume may include the original data stored in the storage volume and meta-data associated with the original data at a particular point in time. The host device may be coupled to the I/O adapter device via a host interface, e.g., a PCIe interface. In some embodiments, the host device may offload copying of data from a first storage volume to a second storage volume to the I/O adapter device. The host device and the I/O adapter device may be part of a computer apparatus. The computer apparatus may be associated with a server computer or with a client computer. In some embodiments, the server computer or the client computer may perform copy operations for data protection, to have high availability of the data or for any suitable tasks, e.g., replica creation, online migration, copy-on-write snapshots, etc. The first and second storage volumes may reside in one or more local storage devices coupled to the computer apparatus and/or one or more remote storage devices communicatively coupled to the computer apparatus via one or more networks. Some non-limiting examples of local storage devices may include SSDs (Solid State Drives), SAS (Serial Attached SCSI), SATA (Serial ATA), rotational media (e.g., hard disks, optical discs, etc.), USB drives, etc. In some instances, the remote storage devices may be accessed via a storage area network (SAN). Some non-limiting examples of the remote storage devices may include SSDs, hard discs, magnetic tapes, etc. Various embodiments of the disclosed technologies can provide improved bandwidth utilization of the host interface and also the memory bandwidth for the host device since processing of data for generating one or more processed data can be performed by the I/O adapter device with minimum access to the host processor or to the host memory, which can help free up the host device resources for other important tasks.

In some embodiments, the host device may offload copy operations to the I/O adapter device for copying a first local storage volume to a second local storage volume or to a first remote storage volume for online migration. The online migration may be performed for various purposes, e.g., upgrade or maintenance, storage device or computer apparatus replacement, application migration, etc. In some embodiments, the host device may offload copy operations to the I/O adapter device for copying a local storage volume to a remote storage volume for replica creation. For example, replica creation may be performed for data protection, high availability of the data or for any other purpose. In some embodiments, the host device may offload copy-on-write snapshot operations to the I/O adapter device for generating and storing snapshots of the storage volumes. For example, a copy-on-write operation may be performed to copy a snapshot of a storage volume to a snapshot volume before the storage volume can be written. In one embodiment, the I/O adapter device may process the data stored in a source storage volume to generate snapshot data for the storage volume and may copy the snapshot data to a destination storage volume (e.g., the snapshot volume) before the data can be updated. For example, the snapshot data may include the original data and meta-data associated with the original data. In another embodiment, new data may be written to a snapshot volume along with the corresponding meta-data instead of updating the original data in the source storage volume. For example, the meta-data may include a time stamp, a source volume identifier, a source block address and any other relevant data. In one embodiment, the I/O adapter device may perform a copy operation to copy a snapshot stored in a snapshot storage volume to a destination storage volume for reconstructing the original storage volume from the stored snapshot.

Various embodiments of the disclosed technologies can minimize traversing the host interface between the host device and the I/O adapter device by offloading certain data processing operations for generating and copying of processed data to one or more destination storage volumes to the I/O adapter device. This may allow for more headroom for other processing by the host device, can improve utilization of resources on the host device and can reduce cost which can result in lower costs for the end users.

FIG. 1 illustrates a system 100 comprising a computer apparatus 102 coupled to one or more local storage devices 112 via one or more bus interfaces 120 and to one or more remote storage devices 116 via one or more networks 110. The computer apparatus 102 may include a host device 104 and an I/O adapter device 106 coupled to the host device 104 via a host interface 108. The host device 104 may include a host processor 104A and a host memory 104B. The one or more local storage devices 112 may include one or more local storage volumes 114. The one or more remote storage devices 116 may include one or more remote storage volumes 118.

The host processor 104A may be configured to execute a plurality of instructions. For example, the instructions may be stored in a computer readable medium (not shown) that may be residing on the host device 104 or be coupled to the host device 104. The host processor 104A may be coupled to a host memory 104B. The host memory 104B may be internal or external to the host device 104B. For example, the host memory 104B may include Dynamic Random Access Memory (DRAM), Synchronous DRAM (SDRAM), Double Data Rate (DDR) SDRAM, etc. In some embodiments, the host memory 104B may be coupled to the host processor 104A via a memory controller (not shown). In some instances, the host processor 104A may execute one or more virtual machines. For example, the one or more virtual machines may be running one or more applications on the host device 104, e.g., database applications. In some instances, a virtual machine running on the host device 104 may perform a copy operation to copy a data block from a source storage volume to a destination storage volume. For example, a data block may include certain units of data, wherein a unit may be defined in bits, bytes, words or by any suitable measure. The data block may include a maximum length defined by a block size. The source and destination storage volumes may include local storage volumes 114 or the remote storage volumes 118.

The host device 104 may communicate with the I/O adapter device 106 via a host interface 108. For example, the host interface 108 may include a standard interface, e.g., a PCIe interface. In some embodiments, the I/O adapter device 106 may be configured to perform network services for the host device 104, e.g., network traffic monitoring, network storage, network processing, etc. Some non-limiting examples of the I/O adapter device 106 may include plug-in modules, expansion cards or any such electronic circuits, e.g., network interface controllers, video cards, sound cards, USB (Universal Serial Bus) devices, Wi-Fi devices, etc.

Typically, the host processor 104A may read a data block from the source storage volume and store it in the host memory 104B. The host processor 104A may then write the data to the destination storage volume from the host memory 104B. For example, in some instances, the host processor 104A may send a request to the I/O adapter device 106 to read the data from the source storage volume. The source storage volume may one of the local storage volumes 114 or the remote storage volumes 118. The I/O adapter device 106 may read the data from the local storage devices 112 via the interface 120 or from the remote storage devices 116 via the networks 110 accordingly. The I/O adapter device 106 may send the data to the host device 104 via the interface 108 for storing in the host memory 104B. The host processor 104A may then send a request to the I/O adapter device 106 to read the data from the host memory 104B for writing it to the destination storage volume. The destination storage volume may one of the local storage volumes 114 or the remote storage volumes 118. The I/O adapter device 106 may read the data from the host memory 104B for writing it to the local storage devices 112 via the interface 120 or to the remote storage devices 116 via the networks 110. Thus, moving the data over the PCIe interface 108 to and from the host memory 104B may consume bandwidth between the host device 104 and the I/O adapter device 106 as well as host memory bandwidth, which can slow down the performance of the host processor 104A for other important tasks thus reducing the throughput of the system. In some instances, the host processor 104A may initiate the copy operation and hand over the data transfer for the copy operation to a DMA (Direct Memory Access) engine to transfer the data block from the source storage volume to the destination storage volume. This may reduce the host processor 104A overhead but may still consume the host memory bandwidth and may not be efficient use of the host memory resources. Thus, typically, data movement between the host memory 104B and the I/O adapter device 106 over the PCIe interface for reading and writing into various storages volumes may not provide the most efficient solution. However, various embodiments of the disclosed technologies can provide improved performance by allowing the host device 104 to offload certain copy operations to the I/O adapter device 106, thus minimizing the usage of the host device resources and increasing the throughput of the system 100.

In some embodiments, a storage volume may include a single accessible storage area, e.g., partition of a hard disc, single storage device, logical drive or a removable storage device. In some embodiments, a single storage device can include one or more storage volumes. In some embodiments, one or more storage volumes can span one or more storage devices. It will be understood that the number of storage volumes can be different or same for each of the storage devices.

The local storage devices 112 may include one or more local storage devices that may be internal or external to the computer apparatus 102. Some non-limiting examples of the local storage devices 112 may include SSDs, compact discs, USB portable drives, SAS drives, SATA drives, e.g., hard disc drives, optical drives, etc. In some embodiments, each local storage device 112 may include one or more local storage volumes 114. In some embodiments, one or more local storage volumes 114 can span one or more local storage devices 112. It will be understood that the number of local storage volumes 114 can be different or same for each of the local storage devices 112. In some instances, the one or more local storage devices 112 may provide faster access time as compared to the one or more remote storage devices 116. In some instances, frequently accessed data can be stored in the local storages devices 112. In some instances, a copy of the data may be stored in the local storages devices 112 for faster recovery of the data in an event the network is down or slow. In some embodiments, the one or more local storages devices 112 may include a snapshot storage volume that can be used for storing meta-data for different snapshots of a storage volume. In some embodiments, the one or more local storage devices 112 may be coupled to the I/O adapter device 106 using one or more interfaces 120, e.g., PCIe interface, SATA interface or any suitable interface.

The one or more remote storage volumes 118 may be part of the one or more remote storage devices 116 that may be communicatively coupled to the computer apparatus 102 via the one or more networks 110. In some embodiments, each remote storage device 116 may include one or more remote storage volumes 118. In some embodiments, the one or more remote storage volumes 118 can span one or more remote storage devices 116. It will be understood that the number of remote storage volumes 118 can be different or same for each of the remote storage devices 116. In some instances, the one or more remote storage devices 116 may provide higher storage capacity as compared to the one or more local storage devices 112. In some embodiments, the one or more remote storage devices 116 may include a snapshot storage volume that can be used for storing meta-data for different snapshots of a storage volume. Some non-limiting examples of the remote storage devices 116 may include hard discs, SSDs, magnetic tapes, etc. The one or more remote storage devices 116 may communicate with the computer apparatus 102 using the same or different networks 110. For example, a first remote storage device may communicate with the computer apparatus 102 using an Ethernet connection and a second remote storage device may communicate with the computer apparatus 102 using a fibre channel.

In some embodiments, the networks 110 may include one or more networks that may be based on different protocols such as the Internet Protocol (IP), Ethernet, Wi-Fi, Transmission Control Protocol (TCP), User Datagram Protocol (UDP), Asynchronous Transfer Mode (ATM), token ring, frame relay, High Level Data Link Control (HDLC), Fiber Distributed Data Interface (FDDI), Point-to-Point Protocol (PPP), etc. It will be understood that different remote storage devices 116 may communicate with the computer apparatus 102 via same or different networks.

In one embodiment, the host processor 104A or a virtual machine running on the host device 104 may determine some of the capabilities of the I/O adapter device 106. For example, one or more bits in certain configuration registers in the I/O adapter device 106 may indicate capability of the I/O adapter device 106 to perform certain data processing to generate one or more processed data. In some embodiments, the I/O adapter device 106 may be capable of processing data stored in a source storage volume for generating one or more copies of the data or for generating snapshot data for the source storage volume for storing in one or more destination storage volumes. In some embodiments, the host processor 104A or a virtual machine may configure the I/O adapter device 106 to perform a transaction for processing data on behalf of the host processor 104A or the virtual machine depending on the capabilities of the I/O adapter device 106. For example, in an event, a request for processing data is initiated by the host processor 104A or the virtual machine, certain information for data processing may be provided to the I/O adapter device 106 in transaction data for the request, e.g., a transaction type, a source volume identifier, a source block address, a block size, a destination volume identifier, a destination block address, and any other relevant information. The transaction type may denote if the transaction is for copying data stored in a source storage volume or for generating meta-data for a snapshot of the source storage volume at a particular point in time. The source volume identifier and the destination volume identifier may be used to identify the source and the destination storage volumes respectively. The source block address and the destination block address may include logical block addresses for the source storage volume and the destination storage volume respectively. For example, the source block address may include a logical block address (LBA) that may indicate a location or a start address where the data block to be copied may be stored in the source storage volume. The destination block address may include an LBA that may indicate a location or a start address in the destination storage volume where the data block can be copied. The block size may indicate size of the block to be copied. In one embodiment, the block size may be represented in units of bits, bytes, words or any other suitable measure.

In some embodiments, the I/O adapter device 106 may receive a request for a transaction for processing data from the source storage volume for storing in one or more destination storage volumes, as discussed above. The source storage volume can reside in the one or more local storage volumes 114 or the one or more remote storage volumes 118. The one or more destination storage volumes can reside in the one or more local storage volumes 114 or the one or more remote storage volumes 118. In one embodiment, the I/O adapter device 106 may read the data block from the source storage volume identified by the source volume identifier and write the processed data block into the destination storage volume identified by the destination volume identifier. In one embodiment, the I/O adapter device 106 may copy the data block from the source storage volume into a local memory (e.g., a payload buffer) and then copy the processed data block from the local memory into the one or more destination storage volumes.

In some instances, the I/O adapter device 106 may receive a request for a transaction for processing data from a source storage volume. For example, the request may include writing or reading from the storage volume. In one embodiment, the I/O adapter device 106 may identify the transaction as a type of transaction for processing the data from the source storage volume for storing in one or more destination storage volumes. For example, the I/O adapter device 106 may process the data from the storage volume to generate one or more copies of the data for storing in the one or more destination storage volumes for high availability of the data. In some embodiments, the I/O adapter device 106 may process the data from the storage volume to generate and store snapshots of the data on a periodic or as needed basis. In some embodiments, the I/O adapter device 106 may receive the request from the host device 104 for a transaction to process the data from a source storage volume. Thus various embodiments of the disclosed technologies can allow performing certain data processing by the I/O adapter device 106 with minimum access to the host memory 104B and the host interface 108, and with minimum host processor 104A intervention. This can reduce jitter and improve the performance of the system.

In some embodiments, a transfer rate for copying a data block from a source storage volume to the one or more destination storage volumes may depend upon a transaction size supported by the networks 110, local storage devices 112 and/or the remote storage devices 116. For example, for reading a data block from a remote storage device or for storing the data block in one of the remote storage devices 116 may depend upon the maximum transmission unit (MTU) or a packet size supported by the particular remote storage device or the network. In some embodiments, if the block size is larger than the transaction size supported by a particular storage device or the network, multiple transactions may be performed between the source and the destination storage devices. For example, if the transaction size supported by the network, the source storage device or the destination storage device is 8K, for a block size of 2 MB, multiple transactions may be performed to copy the data block from the source storage volume to the destination storage volume.

In some embodiments, the copy operation may be performed to create a replica of a storage volume. For example, a replica may be created to have a backup of a storage volume for fault tolerance. In some embodiments, replica of a local storage volume may be created for storing in a remote storage device. For example, in some instances, a remote storage device may provide higher storage capacity as compared to the local storage devices. In the event of a disc failure or data corruption on the local storage device, the data can be recovered from the replica stored on the remote storage device. In some embodiments, the host device 106 may offload the copy operation for the replica creation to the I/O adapter device 106. For example, the I/O adapter device 106 may be configured to perform a copy operation to copy a source storage volume from a local storage device to a destination storage volume from a remote storage device. In some embodiments, the I/O adapter device 106 may receive a request for a transaction for processing data from a source storage volume and the I/O adapter device 106 may process the data from the source storage volume to generate one or more copies of the data for replica creation. It will be understood that replica creation can also be performed from one local storage device to another local storage device, from one remote storage device to another remote storage device, or from a remote storage device to a local storage device.

In some embodiments, the copy operation may be performed for online migration of a storage volume. For example, online migration of a storage volume may be performed to move to a new or different storage volume for maintenance, upgrade, change in location, or for some other criteria. In some embodiments, the host device 106 may offload the copy operation for the online migration to the I/O adapter device 106. For example, the I/O adapter device 106 may be configured to perform a copy operation for online migration of a first local storage volume to a second local storage volume. In one embodiment, the I/O adapter device 106 may be configured to perform a copy operation for online migration of a first local storage volume to a first remote storage volume. In some embodiments, the I/O adapter device 106 may receive a request for a transaction for processing data from a source storage volume and the I/O adapter device 106 may process the data from the source storage volume to generate one or more copies of the data for online migration. It will be understood that the copy operation can be performed for online migration of one local or remote storage volume to another local or remote storage volume.

In some embodiments, the copy operation may be performed for storing snapshot data for a storage volume for data protection or for reading an earlier snapshot for reconstituting the original storage volume. For example, in one embodiment, the I/O adapter device 106 may process the data from a source storage volume to generate snapshot data for copying in a snapshot storage volume. In some instances, a snapshot may represent a change in a state of a storage volume at a particular point in time. The snapshot data may include the data from the storage volume and meta-data associated with the data from the storage volume. In some embodiments, the meta-data may include a time stamp, a source volume identifier, a source block address and any other relevant information related to the snapshot. Snapshots of storage volumes can be time and space efficient as compared to full backups and can be used to recover the data in case of disc failure, data corruption, program malfunction, etc. In one embodiment, a copy operation may be performed to store snapshot data related to the original storage volume to a backup storage volume, when a snapshot is created at first. A copy-on-write operation can copy the original data and the meta-data for the source storage volume to a destination storage volume (e.g., also referred to as a snapshot storage volume) prior to a write operation to the source storage volume. This can allow the data to be consistent in the time based snapshot. In some embodiments, the host device 104 may offload the copy-on-write operations to the I/O adapter device 106 for copying a snapshot of the source storage volume every time new data is entered or existing data is updated in the source storage volume. For example, the host device 104 can send a request for a copy-on-write transaction to the I/O adapter device 106 for generating snapshot data for a source storage volume for storing in one or more destination storage volumes along with meta-data associated with the source storage volume before the source storage volume can be written with new data. In some embodiments, the I/O adapter device 106 may store payload data associated with a transaction and meta-data associated with the payload data to a snapshot storage volume without overwriting the original data in the source storage volume. In some embodiments, the I/O adapter device 106 may receive a request for a transaction for processing data from a source storage volume and may identify the transaction as a type of transaction for generating snapshot data for the source storage volume for storing in one or more destination storage volumes.

Generally, the host device 104 can offload certain copying operations to the I/O adapter device 106 to copy data from a first storage volume to a second storage volume. In some embodiments, the I/O adapter device 106 can generate snapshots of the first storage volume for copying to the second storage volume. The first storage volume and the second storage volume may reside in the one or more local storage volumes 114 and/or the one or more remote storage volumes 118. By offloading some of the copy operations to the I/O adapter device can minimize the usage of the host device resources thus increasing the throughput of the system.

Figure 2:
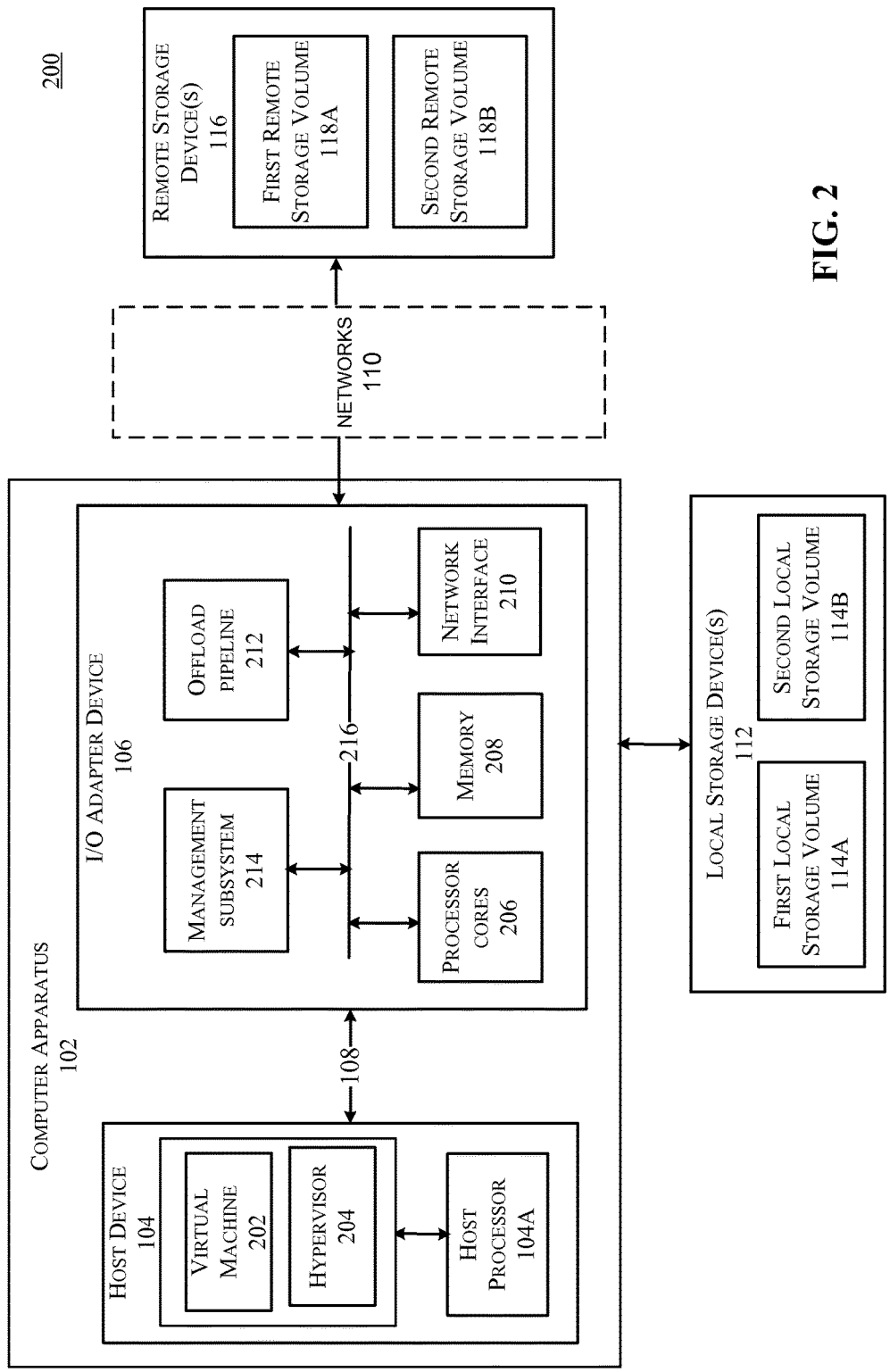
FIG. 2 illustrates a block diagram of a computer apparatus configured to offload certain copy operations to the I/O adapter device, according to one embodiment of the technology.

FIG. 2 illustrates a block diagram of a computer apparatus for offloading copy operations to the I/O adapter device, according to one embodiment of the technology.

The host device 104 may be configured to execute a virtual machine 202. Note that the host device 104 may execute a plurality of virtual machines, however, for ease of simplicity, only virtual machine 202 is shown in FIG. 2. The virtual machine 202 may be any suitable emulation of a computer system that may be managed by a hypervisor 204. For example, in some instances, the virtual machine 202 may need to execute a copy operation for an application running on the host device 104. The hypervisor 204 may be configured to manage the virtual machine 202, for example, to create, start, monitor, stop or to delete the virtual machine 202. The hypervisor 204 may be implemented as a piece of compute software, firmware or hardware.

In some embodiments, the I/O adapter device 106 may present itself as multiple virtual devices to the host device 104. Virtual machines (e.g., the virtual machine 202) running on the host device 104 may use a virtual device on the I/O adapter device 106 as if the virtual device were a physical device. In some instances, the virtual machine 202 may use a virtual device on the I/O adapter device 106 for generating and storing one or more copies in the local storage devices 112 or the remote storage devices 116 across the networks 110. In some instances, the virtual machine 202 may use a virtual device on the I/O adapter device 106 for generating snapshot data for storing in the local storage devices 112 or the remote storage devices 116 across the networks 110. Some non-limiting examples of the emulated devices on the I/O adapter device 106 may include network interface controllers, network processors, storage controllers, etc.

In one embodiment, the local storage devices 112 may include a first local storage volume 114A and a second local storage volume 114B. The first local storage volume 114A and the second local storage volume 114B may be associated with different or same one or more local storage devices 112. In one embodiment, the remote storage devices 116 may include a first remote storage volume 118A and a second remote storage volume 118B. The first remote storage volume 118A and the second remote storage volume 118B may be associated with different or same one or more remote storage devices 116 that may be communicatively coupled to the computer apparatus 102 via different or same one or more networks 110.

In some embodiments, the virtual machine 202 or the host processor 104A may be aware of some of the capabilities of the I/O adapter device 106 to perform certain copy operations. In accordance with various embodiments of the disclosed technologies, the host device 104 may offload certain copy operations to the I/O adapter device 106. For example, in some embodiments, the host processor 104A or the virtual machine 202 can issue a request for a transaction to the I/O adapter device 106. The transaction may be for processing data from a source storage volume for storing in one or more destination storage volumes. The transaction can include transaction data, e.g., a transaction type, a source volume identifier, a source block address, a block size, a destination volume identifier, a destination block address, and any other relevant information, that may be used by the I/O adapter device 106 to perform the transaction. For example, the transaction type may determine if the transaction is a transaction for replica creation, online migration, or copy-on-write snapshot. The I/O adapter device 106 may perform the transaction based on the information provided in the transaction data. This may free up the host device 104 resources for other important tasks.

In some embodiments, the host device 104 may determine capability of the I/O adapter device 106 to perform certain copy operations by reading certain bits in a configuration register in the I/O adapter device, at boot time, or at power up. In one embodiment, the host device 104 may configure the I/O adapter device 106 to perform certain copy operations for different transaction types by configuring one or more bits in certain registers in the I/O adapter device 106. In some embodiments, the I/O adapter device 108 may be configured by an external entity to perform copy operations for different transaction types for the host device 104. In some embodiments, the I/O adapter device 108 may identify a transaction as a type of transaction suitable for performing data processing to generate one or more processed data.

The I/O adapter device 106 may include processor cores 206, a memory 208, a network interface 210, an offload pipeline 212 and a management subsystem 214. Different components of the I/O adapter device 106 may be configured to communicate with one another using an interconnect 216. For example, the interconnect 216 may include busses, mesh, matrix, fabric or any suitable implementation to allow various components of the I/O adapter device 106 to communicate with one another. It will be understood that the I/O adapter device 106 may include more or less components than shown in FIG. 2. For example, the I/O adapter device 106 may also include one or more memory controllers, I/O controllers, etc.

The processor cores 206 may be configured to execute a plurality of instructions on one or more processors of the processor cores 206. Some non-limiting examples of the processor cores 206 may include ARM's cortex A57, MIPS, AMD Phenom, Intel ATOM, etc. The instructions may be stored on a computer-readable storage medium, for example, in the form of a computer program. The computer-readable storage medium may be non-transitory. In some instances, the computer readable medium may be part of the memory 208. The memory 208 may be internal or external to the I/O adapter device 106. For example, the memory 208 may be a RAM, ROM, Electrically Erasable Programmable Read-Only Memory (EEPROM), flash memory or any suitable storage media. In some embodiments, the processor cores 206 may share certain resources, such as busses and Level 1 (L1) caches and/or Level 2 (L2) caches between each of the processor cores.

In one embodiment, the management subsystem 214 may be configured to configure and manage the offload pipeline 212. In some embodiments, the management subsystem 214 may be configured to determine whether the I/O adapter device 106 may perform certain data processing based on a configuration, e.g., one or more bits in a certain configuration register. In some embodiments, one or more bits in a certain configuration register may be configured to enable data processing by the I/O adapter device 106 for specific transaction types. For example, for a copy-on-write transaction, the I/O adapter device 106 may be configured to process the data for generating snapshot data for a storage volume for storing in one or more storage volumes (e.g., local or remote storage). In one embodiment, the I/O adapter device 106 may be configured to process the data from a storage volume for generating snapshot data for the storage volume on a periodic basis, for example, once a day, every few hours, every other week, etc. In one embodiment, the I/O adapter device 106 may be configured to process the data for generating a replica of a local storage volume for storing in a remote storage volume based on certain triggers, e.g., writes to the local storage volume, upgrade of the local storage device, etc.

The network interface 210 may include any suitable interface to enable the I/O adapter device 106 to communicate with the plurality of remote storage devices 116 via the one or more networks 110. For example, the I/O adapter device 106 may communicate with the one or more remote storage devices 116 to store a copy of a first storage volume in one of the remote storage volumes 118 via the one or more networks 110. In some embodiments, the networks 110 may include one or more networks that may be based on different protocols such as the Internet Protocol (IP), Ethernet, Wi-Fi, Transmission Control Protocol (TCP), User Datagram Protocol (UDP), Asynchronous Transfer Mode (ATM), token ring, frame relay, High Level Data Link Control (HDLC), Fiber Distributed Data Interface (FDDI), Point-to-Point Protocol (PPP), etc. For example, in one instance, the network interface 210 may include a physical Ethernet port. It will be understood that in some instances, the networks 110 may include multiple networks and different remote storage devices 116 may use or share one or more networks of the networks 110. For example, the first remote storage volume 118A may use a first network (e.g., an Ethernet network) for data transfer and the second remote storage volume 118B may use a second network (e.g., a Fibre channel) for data transfer.

The offload pipeline 212 may include a plurality of components that may be configured to perform certain data processing on behalf of the host device 104. In one embodiment, the offload pipeline 212 may be configured to perform data processing as configured by the host device 104. For example, the offload pipeline 212 may perform copy operations to copy from a source storage volume to a destination storage volume for replica creation, online migration, copy-on-write snapshots, or for any other suitable task. For example, the source storage volume or the destination source volume may include one of the first local storage volume 114A, second local storage volume 114B, first remote storage volume 118A or the second remote storage volume 118B. An exemplary block diagram of the offload pipeline 212 is discussed with reference to FIG. 3.

Figure 3:
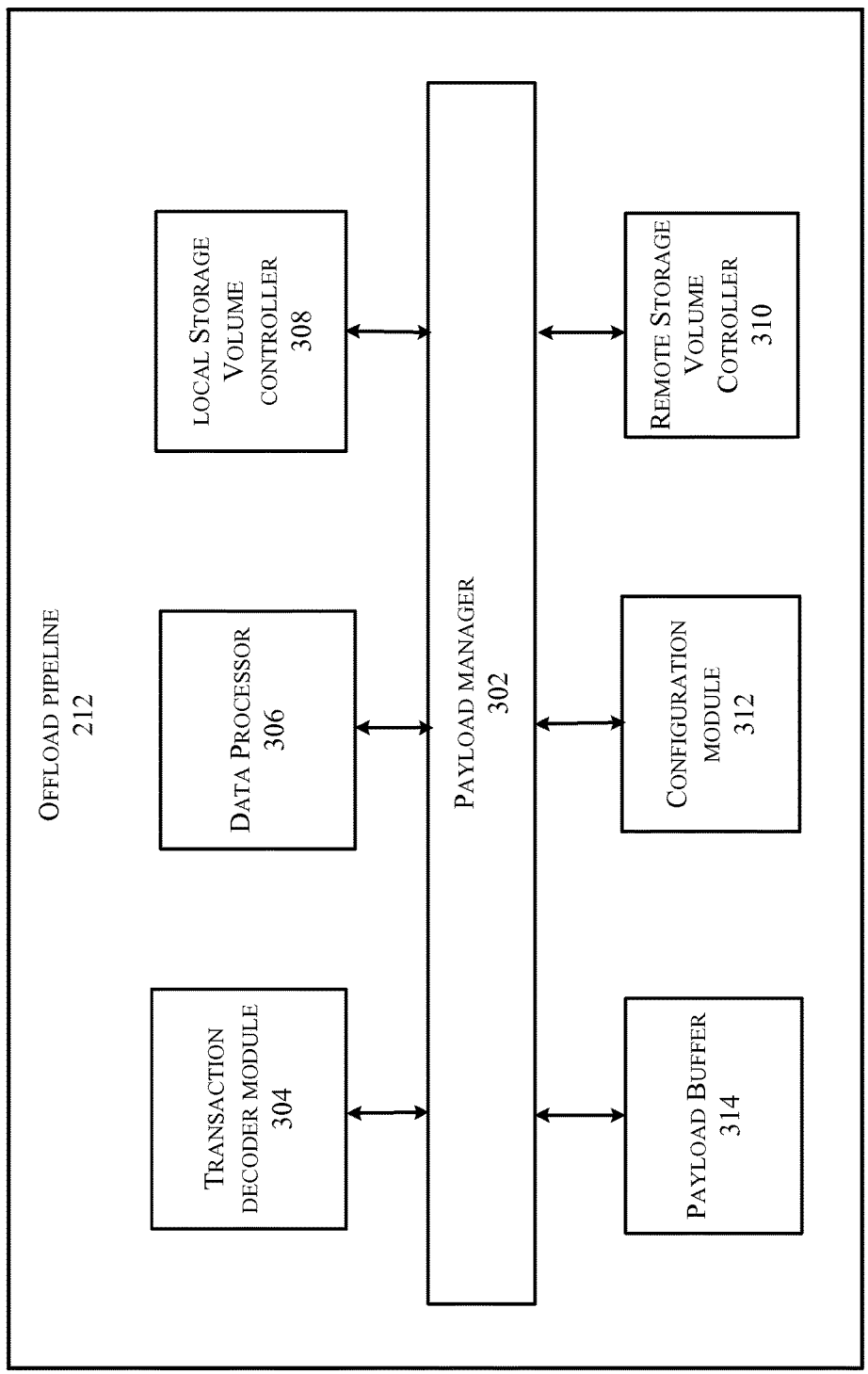
FIG. 3 illustrates components of an offload pipeline in accordance with one embodiment of the disclosed technology.

FIG. 3 illustrates components of an offload pipeline in accordance with one embodiment of the disclosed technology.

The offload pipeline 212 may include a payload manager 302, a transaction decoder module 304, a data processor 306, a local storage volume controller 308, a remote storage volume controller 310, a configuration module 312 and a payload buffer 314.

The transaction decoder module 304 may be configured to decode transaction data associated with the requests received by the I/O adapter device 106. The transaction decoder module 304 may be further configured to identify the transaction as a type of transaction for processing the data from a source storage volume for storing in one or more destination storage volumes. In one embodiment, the transaction decoder module 304 may receive a request from the host device 104 for a transaction. For example, the request may be initiated by the virtual machine 202 running on the host device 104 for a copy operation. In one embodiment, the transaction data may include a transaction type, a source volume identifier, a source block address, a block size, a destination volume identifier, a destination block address, and any other relevant information. In some embodiments, the transaction decoder module 304 may identify the transaction as a type of transaction suitable for performing certain data processing to generate one or more processed data based on one or more bits in certain configuration registers. In one embodiment, the transaction decoder module 304 may intercept a command from a command queue (not shown) that may be used to store commands from the host device 104. The transaction decoder module 304 may decode the command and may determine that the command includes a request for a transaction to copy data from a source storage volume to one or more destination storage volumes. In some embodiments, the transaction decoder module 304 may identify that the copy operation is for replica creation, online migration, copy-on-write snapshots or for any other task, based on one or more bits in the transaction data. For example, the transaction decoder module 304 may determine that the transaction is for copying data from a source storage volume to one or more destination storage volumes for replica creation based on a first transaction type. In one embodiment, the transaction decoder module 304 may determine that the transaction is for copying data from a source storage volume to one or more destination storage volumes for online migration based on a second transaction type. In another embodiment, the transaction decoder module 304 may determine that the transaction is for copying snapshot data for a source storage volume to one or more destination storage volumes based on a third transaction type. In one embodiment, if the transaction decoder module 304 determines that the transaction is a copy-on-write transaction type, the transaction decoder module 304 may communicate with the data processor 306 for generating meta-data for a snapshot of the source storage volume. In one embodiment, the transaction decoder module 304 may determine that the transaction is for copying data from a source storage volume (e.g., snapshot storage volume) to a destination storage volume to recover the data from a snapshot stored in the source storage volume based on a fourth transaction type. In one embodiment, the transaction decoder module 304 may determine that the transaction is for copying payload data for the transaction along with corresponding meta-data to a destination storage volume (e.g., snapshot storage volume) without writing to the source storage volume based on a fifth transaction type. The transaction decoder module 304 may identify the source storage volume and the destination storage volume based on the source volume identifier and the destination volume identifier respectively.

The configuration module 312 may include one or more configuration registers that can be used to configure the I/O adapter device 106 to perform certain data processing operations. In some embodiments, one or more bits in certain configuration registers may be used to identify what type of data processing may be performed for a transaction received by the I/O adapter device 106. In some embodiments, the one or more configuration registers can be configured by the host device 104, an external entity or by BIOS software (e.g., at power up or boot time). In one embodiment, the host device 104 may access certain bits of a configuration register to determine some of the capabilities of the I/O adapter device 106, e.g., data copying, etc. for offloading certain copying functionalities to the I/O adapter device 106. In one embodiment, one or more bits in a certain configuration register may be configured for generating one or more copies of the data for replica creation of the data read from the source storage volume for storing in the one or more destination storage volumes for the first transaction type. In one embodiment, one or more bits in a certain configuration register may be configured for generating one or more copies of the data for online migration of the data read from the source storage volume to the one or more destination storage volumes for the second transaction type. In one embodiment, one or more bits in a certain configuration register may be configured for generating meta-data for a snapshot of the source storage volume for storing in the one or more destination storage volumes for the third transaction type. In one embodiment, one or more bits in a certain configuration register may be configured for generating one or more copies of the data and corresponding meta-data stored in the source storage volume for copying in the one or more destination storage volumes for the fourth transaction type. In one embodiment, one or more bits in a certain configuration register may be configured for generating one or more copies of payload data for a transaction for storing in a snapshot storage volume along with corresponding meta-data instead of updating the data stored in the source storage volume for the fifth transaction type.

The payload manager 302 may be configured to manage reading and writing of the local and remote storage volumes. In one embodiment, the payload manager 302 may be configured to manage reading of the data from the source storage volume and sending one or more copies of the data for storing in the one or more destination storage volumes. For example, in one embodiment, the payload manager 302 may receive the transaction data associated with the source storage volume (e.g., source volume identifier, source block address, block size, etc.) from the transaction decoder module 304. The payload manager 302 may identify that the source volume storage is associated with a local storage volume or a remote storage volume based on the source volume identifier. The payload manager 302 may then send the information associated with the source storage volume to the local storage volume controller 308 if the source storage volume belongs to the local storage devices 112 or to the remote storage volume controller 310 if the source storage volume belongs to the remote storage devices 116. In one embodiment, the payload manager 302 may store the data read from the source storage volume into the payload buffer 314. For example, the local storage volume controller 308 may read the data from one of the local storage devices 112 or the remote storage devices 116 and send it to the payload manager 302 for storing in the payload buffer 314. The data stored in the payload buffer 314 can be read by the data processor 306 for processing the data to generate one or more processed data. In some embodiments, the payload manager 302 may send the payload data for a transaction to the data processor 306 for generating meta-data associated with the payload data for storing the payload data and the meta-data in a snapshot storage volume.

In one embodiment, the payload manager 302 may receive the information associated with the destination storage volume (e.g., destination volume identifier, destination block address, etc.) from the transaction decoder module 304. The payload manager 302 may identify that the destination volume storage is associated with a local storage volume or a remote storage volume based on the destination volume identifier. The payload manager 302 may then send one or more processed data generated by the data processor 306 and the information associated with the destination storage volume to the local storage volume controller 308 if the destination storage volume belongs to the local storage devices 112 or to the remote storage volume controller 310 if the destination storage volume belongs to the remote storage devices 116. In one embodiment, the payload manager 302 may store the one or more processed data generated by the data processor 306 into the payload buffer 314. For example, the local storage volume controller 308 may read the data from the payload buffer 314 and send it for storing in one of the local storage devices 112. Similarly, the remote storage volume controller 310 may read the data from the payload buffer 314 and send it for storing in one of the remote storage devices 116.

In some embodiments, the payload manager 302 may manage a rate of transfer of the data between the source storage volume and the destination storage volumes based on the transaction size supported by the source storage device, destination storage device and the network protocol (if applicable). In one embodiment, the payload manager 302 may determine a maximum transaction size supported by a storage volume device based on the volume identifier. For example, in one embodiment, the rate of transfer may be limited by the MTU supported by the remote storage device and/or the network. In one embodiment, the payload manager 302 may communicate with the local storage volume controller 308 or the remote storage volume controller 310 for performing multiple transactions to support the allowable transaction size for writing the data into the payload buffer or reading the data from the payload buffer.

The data processor 306 may be configured to process the data from a source storage volume to generate one or more processed data. For example, the processed data may include a copy of the data or meta-data for a snapshot. In one embodiment, the data to be processed may be stored in the payload buffer 314 by the payload manager 302. The data processor 306 may read the data from the payload buffer 314 and may generate one or more processed data for sending to the local storage volume controller 308 or the remote storage volume controller 310 for storing in the one or more destination storage volumes. In one embodiment, the data processor 306 may read the data to be processed directly from the source storage volume based on the transaction data associated with the source storage volume (e.g., source volume identifier, source block address, block size, etc.). In one embodiment, the data processor 306 may process the data to generate one or more replicas of the data based on the transaction type that can be used for fault tolerance or to make the data highly available. In one embodiment, the data processor 306 may process the data to generate one or more copies of the data based on the transaction type for online migration of the data from a source storage volume to a destination storage volume.

In one embodiment, the data processor 306 may process the data from the source storage volume to generate snapshot data for the source storage volume based on the transaction type. The snapshot data can include data from the source storage volume and meta-data associated with the data from the source storage volume. For example, in one embodiment, the data stored in the source storage volume may be copied to the one or more destination storage volumes (e.g., a snapshot storage volume) along with meta-data associated with the data for a copy-on-write transaction before the new data can be written to overwrite or replace the original data. In another embodiment, the snapshot data can include new data (e.g., payload data of a transaction) and the meta-data associated with the new data. For example, the snapshot data can be copied to a snapshot storage volume without overwriting the original data in the source storage volume. In one embodiment, a snapshot of a source storage volume can represent a change in a state of the source storage volume at a particular point in time. In one embodiment, the meta-data can include data related to changes in state of the source storage volume between different snapshots. In one embodiment, the meta-data includes a time stamp, a source block address for the source storage volume and a source volume identifier. In one embodiment, the data processor 306 may generate snapshot data for a storage volume for storing in the one or more destination storage volumes on a periodic basis as determined by one or more bits of a certain configuration register. For example, different snapshots of a storage volume at different points in time may be stored every hour, every day, every other week or any suitable frequency. In one embodiment, the snapshot data may be stored in a snapshot storage volume that may be a dedicated storage area residing in the local storage devices 112 or the remote storage devices 116. In some embodiments, the one or more copies of the snapshots may be used to reconstruct the original data. In one embodiment, the data processor 306 may process the snapshot data from the source storage volume (e.g., snapshot storage volume) to generate one or more copies of the snapshot data for storing in the one or more destination storage volumes. For example, the snapshot data for the previous snapshots can be used by the I/O adapter device 106 or by the host device 104 to recover the original data in case of data corruption, disc failure or any other reason.

The payload buffer 314 may include an on-chip memory to store the data. In some embodiments, the payload buffer 314 may include a memory that can provide fast access time for writing and reading the data, e.g., an SRAM (Static Random Access Memory). In some embodiments, storing and retrieving the data from the payload buffer 314 may be managed by the payload manager 302. In one embodiment, the payload buffer 314 may be used to store the data for processing by the data processor 308. In one embodiment, the data stored in the payload buffer 314 may be used for sending to a destination storage volume via the local storage volume controller 308 or the remote storage volume controller 310. For example, the data stored in the payload buffer 314 may include one or more copies of the data or snapshot data.

The local storage volume controller 308 may be configured to control the access to the one or more local storage volumes 114 associated with the one or more local storage devices 112. For example, in one embodiment, the local storage volume controller 308 may facilitate storage of one or more copies of the data in the one or more local storage devices 112. In another embodiment, the local storage volume controller 308 may facilitate reading of the data from one of the local storage devices 112 for generating one or more copies of the data for replica creation, online migration, copy-on-write snapshot creation or for any other purposes. In one embodiment, the local storage volume controller 308 may include a PCIe controller for accessing the one or more local storage devices 112 via a PCIe interface. In another embodiment, the local storage volume controller 308 may include a SATA controller for accessing the one or more local SATA devices via a SATA interface. In some embodiments, the local storage volume controller 308 may access a local storage device for data transfer based on the transaction size supported by the local storage device.

The remote storage volume controller 310 may be configured to prepare one or more processed data for sending to the remote storage devices 116 for storing in the one or more remote storage volumes 118 via the one or more networks 110. For example, the remote storage volume controller 310 may communicate with the network interface 210 for sending the one or more processed data to the one or more remote storage volumes 118 via the networks 110. In one embodiment, the remote storage volume controller 310 may encrypt one or more processed data for secure transmission over the networks 110. In some embodiments, each processed data may be transmitted to the respective remote storage volume in the form of a packet. For example, a first packet may include a first packet header with a first processed data for a first remote storage volume and a second packet may include a second packet header with a second processed data for a second remote storage volume. In one embodiment, each packet header may include network protocol information (e.g., TCP/IP, UDP, etc.), source address, destination address, remote storage volume start address, block size and any other relevant data. For example, in one embodiment, the source address may correspond to the MAC address of the I/O adapter device 106 and the destination address may correspond to the MAC address of the remote storage device. The remote storage volume start address may correspond to the start address of the storage volume for the respective remote device and the block size may correspond to the size of the storage block. In some embodiments, the remote storage volume controller 310 may control the access to a remote storage device via the network interface 110 for data transfer based on the transaction size or the MTU supported by the remote storage device and/or the one or more networks 110.

Figure 4:
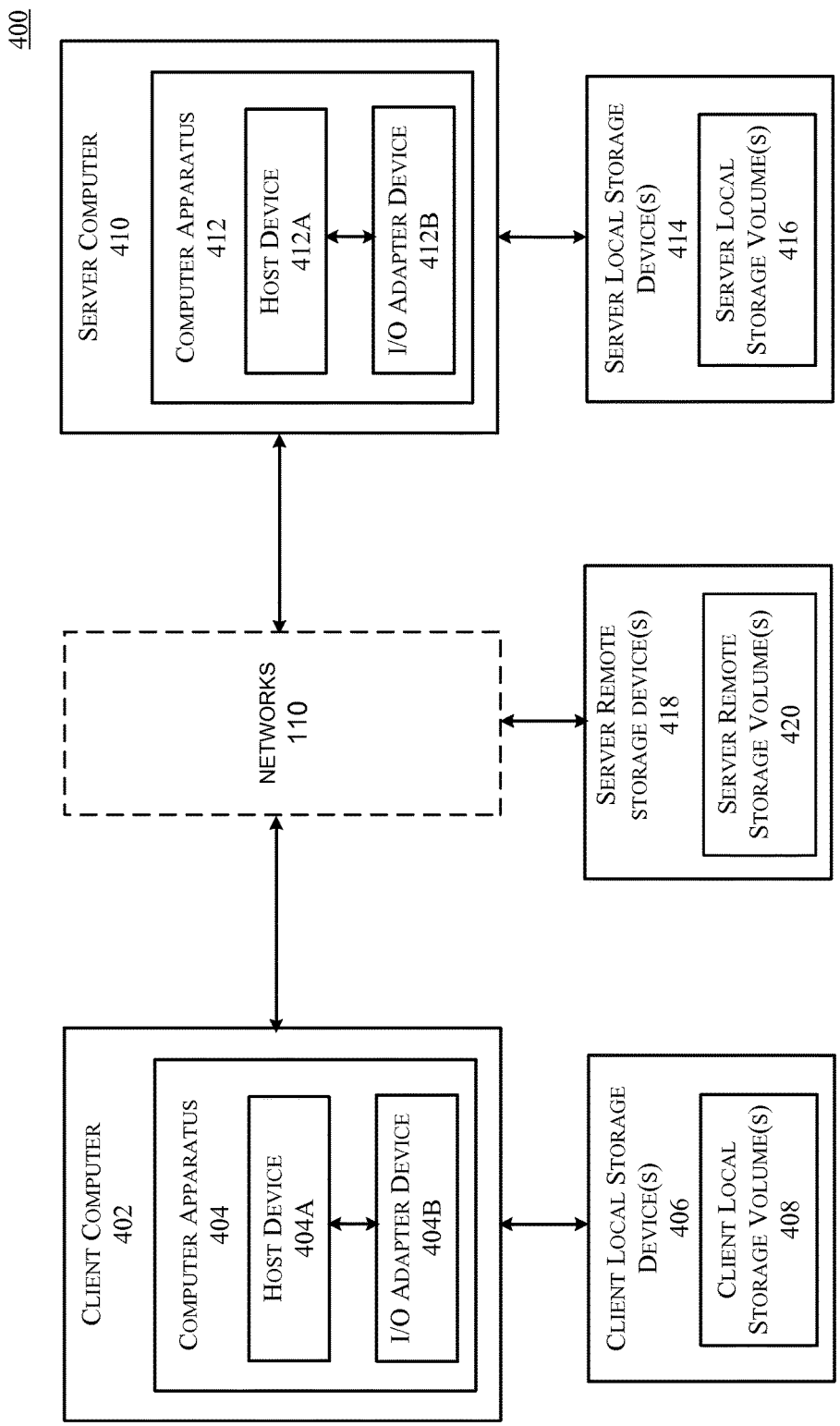
FIG. 4 illustrates a system including separate instances of the computer apparatus in a client computer and in a server computer, according to some embodiments of the technology.

FIG. 4 illustrates a system 400 including separate instances of the computer apparatus in a client computer and in a server computer, according to some embodiments of the technology.

In some embodiments, offloading of certain copy operations to an I/O adapter device by a host device can be utilized on the client side as well as the server side. As illustrated in FIG. 4, a client computer 402 may include a computer apparatus 404 and a server computer 410 may include a computer apparatus 412. The client computer 402 and the server computer 410 may be communicatively coupled via the networks 110. The client computer 402 may be coupled to one or more client local storage devices 406 comprising one or more client local storage volumes 408. The server computer 410 may be coupled to one or more server local storage devices 414 comprising one or more server local storage volumes 416. The server computer 410 may also be communicatively coupled to one or more server remote storage devices 418 via the one or more networks 110. The one or more server remote storage devices 418 may comprise one or more server remote storage volumes 420.

The computer apparatus 404 and the computer apparatus 412 may be similar to the computer apparatus 102 as discussed with reference to FIGS. 1-3. For example, according to various embodiments of the disclosed technologies, a host device 404A in the computer apparatus 404 may be configured to offload certain copy operations to an I/O adapter device 404B. For example, a virtual machine running on the host device 404A may need to perform a copy operation to copy a data block from a source storage volume to a destination storage volume. As discussed previously, the copy operations may be performed for replica creation, online migration or snapshot creation based on the transaction type. In one embodiment, the source storage volume may be a client local storage volume 408 and the destination storage volume may be a remote storage volume across the networks 110 that may be a block storage device emulated by the server computer 410. According to some embodiments, the virtual machine may offload the copy operation to the I/O adapter device 404B. In one embodiment, an offload pipeline (e.g., the offload pipeline 212) may perform the copy operation as discussed with reference to FIG. 3. For example, the offload pipeline in the I/O adapter device 404B may read the data block from the client local storage volume 408 and send the one or more copies to the server computer 410 for storing in the server remote storage volumes 420 or the server local storage volumes 416. In one embodiment, the offload pipeline in the I/O adapter device 404B may generate snapshot data for a storage volume for copying to a destination storage volume.

In some embodiments, a host device 412A in the computer apparatus 412 may be configured to offload certain copy operations to an I/O adapter device 412B. For example, a host processor in the host device 412A may need to perform a copy operation to copy a data block from a source storage volume to a destination storage volume. As discussed previously, the copy operations may be performed for replica creation, online migration or snapshot creation based on the transaction type. In one embodiment, the source storage volume may be a server local storage volume 416 and the destination storage volume may be a server remote storage volume 420. According to some embodiments, the host device 412A may offload the copy operation to the I/O adapter device 412B. An offload pipeline (e.g., the offload pipeline 212) may perform the copy operation as discussed with reference to FIG. 3. For example, in one embodiment, the offload pipeline in the I/O adapter device 412B may read the data block from the server local storage volume 416 and send the one or more copies for storing in the server remote storage volumes 420 across the networks 110. In another embodiment, the offload pipeline in the I/O adapter device 412B may read the data block from the server remote storage volumes 420 via the networks 110 and send the one or more copies for storing in the server local storage volumes 416. In one embodiment, the offload pipeline in the I/O adapter device 412B may generate snapshot data for a storage volume for copying to a destination storage volume.

As discussed with reference to FIGS. 1-4, the offload pipeline 212 in the I/O adapter device 106 may process the data from a source storage volume to generate one or more processed data for storing in the one or more destination storage volumes. In one embodiment, the I/O adapter device 106 may process the data from the source storage volume to generate one or more copies of the data, as discussed with reference to FIG. 5A. In one embodiment, the I/O adapter device 106 may process the data from the source storage volume to generate snapshot data for the source storage volume, as discussed with reference to FIG. 5B.

Figure 5A:
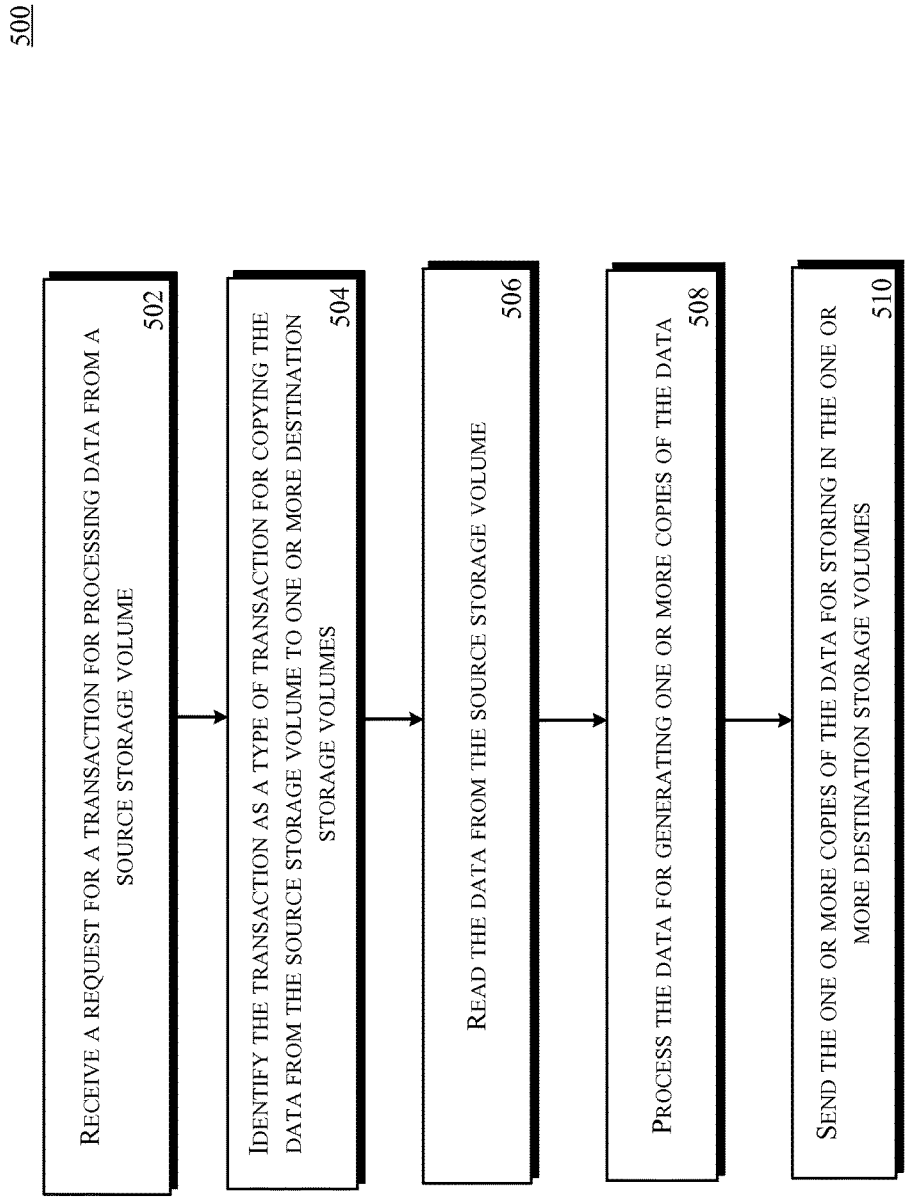
FIG. 5A illustrates a method for generating and storing one or more copies of a storage volume by an I/O adapter device, according to some embodiments of the disclosed technology.

FIG. 5A illustrates an exemplary method 500 for performing copy operation by an I/O adapter device, according to some embodiments of the technology.

In step 502, a request for a transaction for processing data from a source storage volume is received by an I/O adapter device. For example, referring back to FIG. 2, the I/O adapter device 106 may receive a request for a transaction for processing data from one of the local storage devices 112 or one of the remote storage devices 116. In one embodiment, the request for the transaction may be received from the host device 104. In one embodiment, the I/O adapter device 106 may intercept a command from a command queue that may be used for storing all the commands received from the host device 104. In some embodiments, the host device 104 may need to perform a copy operation to copy data from a source storage volume to a destination storage volume. For example, the source storage volume may be the first local storage volume 114A or the first remote storage volume 118A, and the destination storage volume may be the second local storage volume 114B or the second remote storage volume 118B. In some embodiments, a virtual machine running on the host device 104 or the host processor 104A may need to perform a copy operation for replica creation, online migration, snapshot or for any other purpose. The host device 104 may determine capability of the I/O adapter device 106 to perform certain data processing. For example, the host device 104 may read one or more bits of certain configuration register in the I/O adapter device 106 to determine the capability of the I/O adapter device 106 to perform certain copy operations. In accordance with various embodiments of the disclosed technologies, the host device 104 may offload the copy operation to the I/O adapter device 106 to copy data from the source storage volume to the destination storage volume.

In step 504, the I/O adapter device 106 may identify the transaction as a type of transaction for copying data from a source storage volume to one or more destination storage volumes. In one embodiment, the transaction decoder module 304 may identify the transaction as the type of transaction suitable for processing the data based on one or more bits in certain configuration registers to generate one or more copies of the data for storing in the one or more destination storage volumes. Referring back to FIG. 3, in one embodiment, the transaction decoder module 304 may decode the transaction data associated with the request received from the host device 104. In one embodiment, the transaction data may include a transaction type, a source volume identifier, a source block address, a block size, a destination volume identifier, a destination block address, and any other relevant information. The transaction decoder module 304 may identify the source storage volume and the destination storage volume based on the source volume identifier and the destination volume identifier respectively. In some embodiments, the transaction decoder module 304 may identify that the copy operation is for replica creation, online migration, snapshot or for any other purpose based on the transaction type.

In step 506, the I/O adapter device 106 can read the data from the source storage volume. As discussed with reference to FIG. 3, the payload manager 302 may identify that the source volume storage is associated with a local storage volume or a remote storage volume based on the source volume identifier received in the transaction data. The payload manager 302 may then send the transaction data associated with the source storage volume (e.g., source block address, block size) to the local storage volume controller 308 if the source storage volume belongs to the local storage devices 112 or to the remote storage volume controller 310 if the source storage volume belongs to the remote storage devices 116. If the source storage volume belongs to the local storage devices 112, the local storage volume controller 308 may perform a read from the local storage volume based on the source block address and the block size. In some embodiments, based on the transaction size supported by the local storage device and the block size, the local storage volume controller 308 may perform multiple transactions to read the data. The local storage volume controller 308 may provide the data read from the local storage volume to the payload manager 302 for sending it to the data processor 306 or to the payload buffer 314. If the source storage volume belongs to the remote storage devices 116, the remote storage volume controller 310 may send the source block address and the block size to the network interface 310 for sending the read request to the remote storage devices 116 via the networks 110. In some embodiments, based on the transaction size or the MTU supported by the remote storage device and the block size, the remote storage volume controller 310 may perform multiple transactions to read the data. In some embodiments, the network interface 310 may receive the data read from the remote storage devices 116 via the networks 110 and may send the data to the payload manager 302 for sending it to the data processor 306 or to the payload buffer 314.

In step 508, the data read from the source storage volume can be processed to generate one or more copies of the data. Referring back to FIG. 3, the data processor 306 may process the data to generate one or more copies of the data read from the source storage volume. In one embodiment, the data processor 306 may process the data to generate one or more replicas of the data that can be used for fault tolerance or to make the data highly available. In one embodiment, the data processor 306 may process the data to generate one or more copies of the data for online migration of the data from a source storage volume to a destination storage volume. In one embodiment, the data processor 306 may generate one or more copies of the snapshot data that may be stored in the source storage volume. For example, the one or more copies of the snapshot data may be used to reconstruct the original data.

In step 510, the one or more copies of the data can be sent for storing in the one or more destination storage volumes. In some embodiments, the payload manager 302 may identify the one or more destination storage volumes based on the transaction data received from the transaction decoder module 304 (e.g., destination volume identifier, destination block address, etc.), as discussed with reference to FIG. 3. The payload manager 302 may then send one or more copies of the data generated by the data processor 306 and the transaction data to the local storage volume controller 308 if the destination storage volume belongs to the local storage devices 112 or to the remote storage volume controller 310 if the destination storage volume belongs to the remote storage devices 116. In one embodiment, the local storage volume controller 308 may store the one or more copies to the local storage volumes 114 via the interface 120. In some embodiments, the local storage volume controller 308 may perform the data transfer based on the transaction size supported by the local storage device. In one embodiment, the remote storage volume controller 310 may send the one or more copies to the network interface 310 for storing in the remote storage volumes 188. For example, in one embodiment, the network interface 310 may transmit a first copy with a first packet header in a first packet to the first remote storage volume 118A or the second remote storage volume 118B via the networks 110. In one embodiment, the one or more copies of the data can be sent to a snapshot storage volume (e.g., local or remote storage volume) for a copy-on-write request before the new data can be written to overwrite or replace the original data in the source storage volume. In some embodiments, the remote storage volume controller 310 may perform the data transfer via the network interface 110 based on the transaction size or the MTU supported by the remote storage device and/or the one or more networks 110.

Figure 5B:
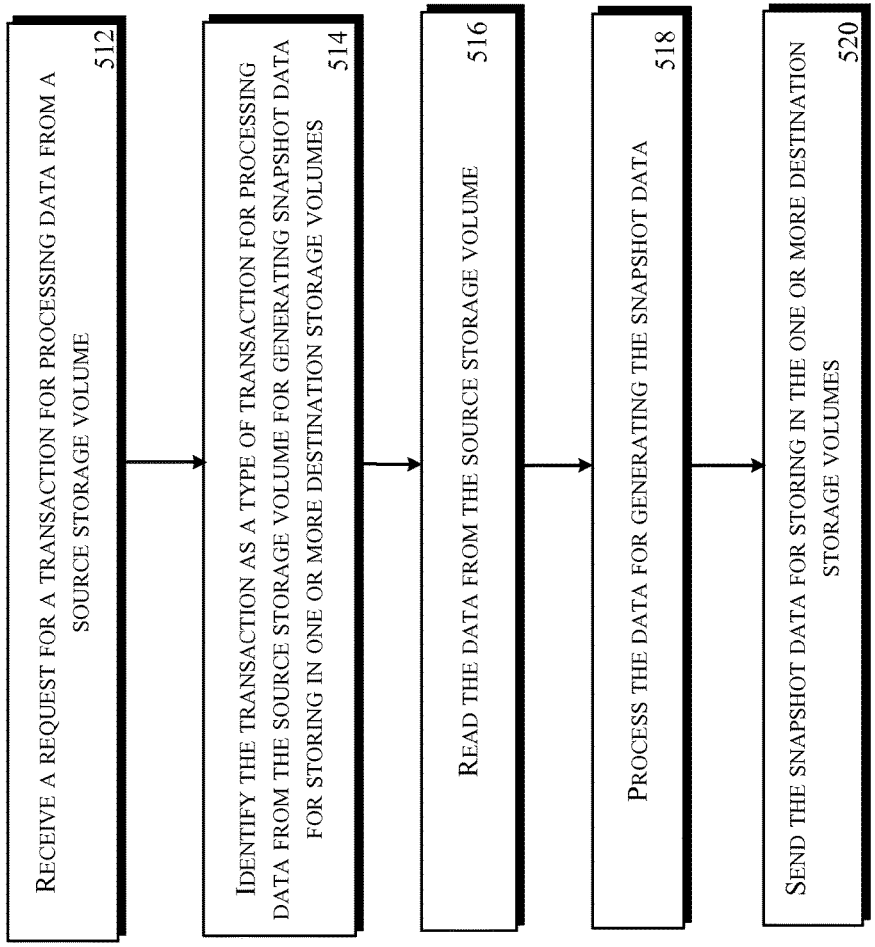
FIG. 5B illustrates a method for generating and storing meta-data for a snapshot of a storage volume by an I/O adapter device, according to some embodiments of the disclosed technology.

FIG. 5B illustrates an exemplary method for generating and storing snapshot data by an I/O adapter device, according to some embodiments of the technology.

In step 512, a request for a transaction for processing data from a source storage volume is received by an I/O adapter device. For example, referring back to FIG. 2, the I/O adapter device 106 may receive a request for a transaction for processing data from one of the local storage devices 112 or one of the remote storage devices 116. In one embodiment, the request for the transaction may be received from the host device 104. As discussed with reference to step 502 in FIG. 5A, the I/O adapter device 106 may intercept a command from a command queue that may be used for storing all the commands received from the host device 104. In some embodiments, a virtual machine running on the host device 104 or the host processor 104A may need to generate snapshot data for a storage volume for storing in a snapshot storage volume. For example, the snapshot data may include the data from the storage volume and meta-data associated with the data from the storage volume. The host device 104 may determine capability of the I/O adapter device 106 to generate snapshot data. For example, the host device 104 may read one or more bits of certain configuration register in the I/O adapter device 106 to determine the capability of the I/O adapter device 106 to perform certain data processing. In accordance with various embodiments of the disclosed technologies, the host device 104 may offload the processing of the data stored in the source storage volume to the I/O adapter device 106 for generation of the snapshot data for the source storage volume.

In step 514, the I/O adapter device 106 may identify the transaction as a type of transaction for processing data from the source storage volume for generating snapshot data for storing in one or more destination storage volumes. In one embodiment, the transaction decoder module 304 may identify the transaction as the type of transaction suitable for processing the data based on one or more bits in certain configuration registers to generate snapshot data for storing in the one or more destination storage volumes. Referring back to FIG. 3, in one embodiment, the transaction decoder module 304 may decode the transaction data associated with the request received from the host device 104. In one embodiment, the transaction data may include a transaction type, a source volume identifier, a source block address, a block size, a destination volume identifier, a destination block address, and any other relevant information. For example, the transaction decoder module 304 may identify that the transaction is for the generation of snapshot data for the source storage volume based on the transaction type. The transaction decoder module 304 may identify the source storage volume and the destination storage volume based on the source volume identifier and the destination volume identifier respectively.

In step 516, the I/O adapter device 106 can read the data from the source storage volume. As discussed with reference to step 506 in FIG. 5A, if the source storage volume belongs to the local storage devices 112, the local storage volume controller 308 may perform a read from the local storage volume based on the source block address and the block size. If the source storage volume belongs to the remote storage devices 116, the remote storage volume controller 310 may send the source block address and the block size to the network interface 310 for sending the read request to the remote storage devices 116 via the networks 110. In some embodiments, the network interface 310 may receive the data read from the remote storage devices 116 via the networks 110 and may send the data to the payload manager 302 for sending it to the data processor 306 or to the payload buffer 314.

In step 518, the data read from the source storage volume can be processed to generate the snapshot data. Referring back to FIG. 3, the data processor 306 may process the data from the source storage volume to generate snapshot data for the source storage volume. In one embodiment, the data processor 306 may generate meta-data associated with the data stored in the source storage volume for storing with the data from the source storage volume. For example, the meta-data may include a time stamp, a source block address for the source storage volume and a source volume identifier. In one embodiment, the data stored in the source storage volume may be copied to the one or more destination storage volumes (e.g., a snapshot storage volume) for a copy-on-write transaction before the new data can be written to overwrite or replace the original data. In another embodiment, new data (e.g., payload data associated with a transaction) and meta-data associated with the new data can be copied to a snapshot storage volume without overwriting the original data in the source storage volume. In one embodiment, a snapshot can represent a change in a state of the source storage volume at a particular point in time. For example, the snapshot data can include changes in state of the source storage volume between different snapshots. As discussed with reference to FIG. 3, in some embodiments, the I/O adapter device 106 can be configured to generate snapshot data for the source storage volume on a periodic basis.

In step 520, the snapshot data can be sent for storing in the one or more destination storage volumes. In some embodiments, the payload manager 302 may identify the one or more destination storage volumes based on the transaction data received from the transaction decoder module 304 (e.g., destination volume identifier, destination block address, etc.), as discussed with reference to FIG. 3. For example, the destination storage volume may be the snapshot storage volume representing a dedicated storage area for storing snapshots. The payload manager 302 may then send the snapshot data generated by the data processor 306 to the local storage volume controller 308 if the snapshot storage volume belongs to the local storage devices 112 or to the remote storage volume controller 310 if the destination storage volume belongs to the remote storage devices 116. In one embodiment, the local storage volume controller 308 may store the snapshot data to the local storage volumes 114 via the interface 120. In some embodiments, the local storage volume controller 308 may perform the data transfer based on the transaction size supported by the local storage device. In one embodiment, the remote storage volume controller 310 may send the snapshot data to the network interface 310 for storing in the remote storage volumes 188, e.g., in the form of a packet. In some embodiments, the remote storage volume controller 310 may perform the data transfer via the network interface 110 based on the transaction size or the MTU supported by the remote storage device and/or the one or more networks 110.

Various embodiments of the disclosed technologies can allow a host device to offload certain data processing operations to an I/O adapter device in a computer apparatus. In some embodiments, the host device may offload copying of data from a first storage volume to a second storage volume to the I/O adapter device. The copy operations may be performed for data protection, to have high availability of the data or for any suitable tasks, e.g., replica creation, online migration, snapshots, etc. In some embodiments, the I/O adapter device may generate snapshot data for a storage volume for copying to a destination storage volume. The first and second storage volumes may be associated with one or more local storage devices coupled to the computer apparatus and/or one or more remote storage devices communicatively coupled to the computer apparatus via one or more networks. This may allow for more headroom for other processing by the host device, can improve utilization of resources on the host device and can reduce cost which can result in lower costs for the end users.

Figure 6:
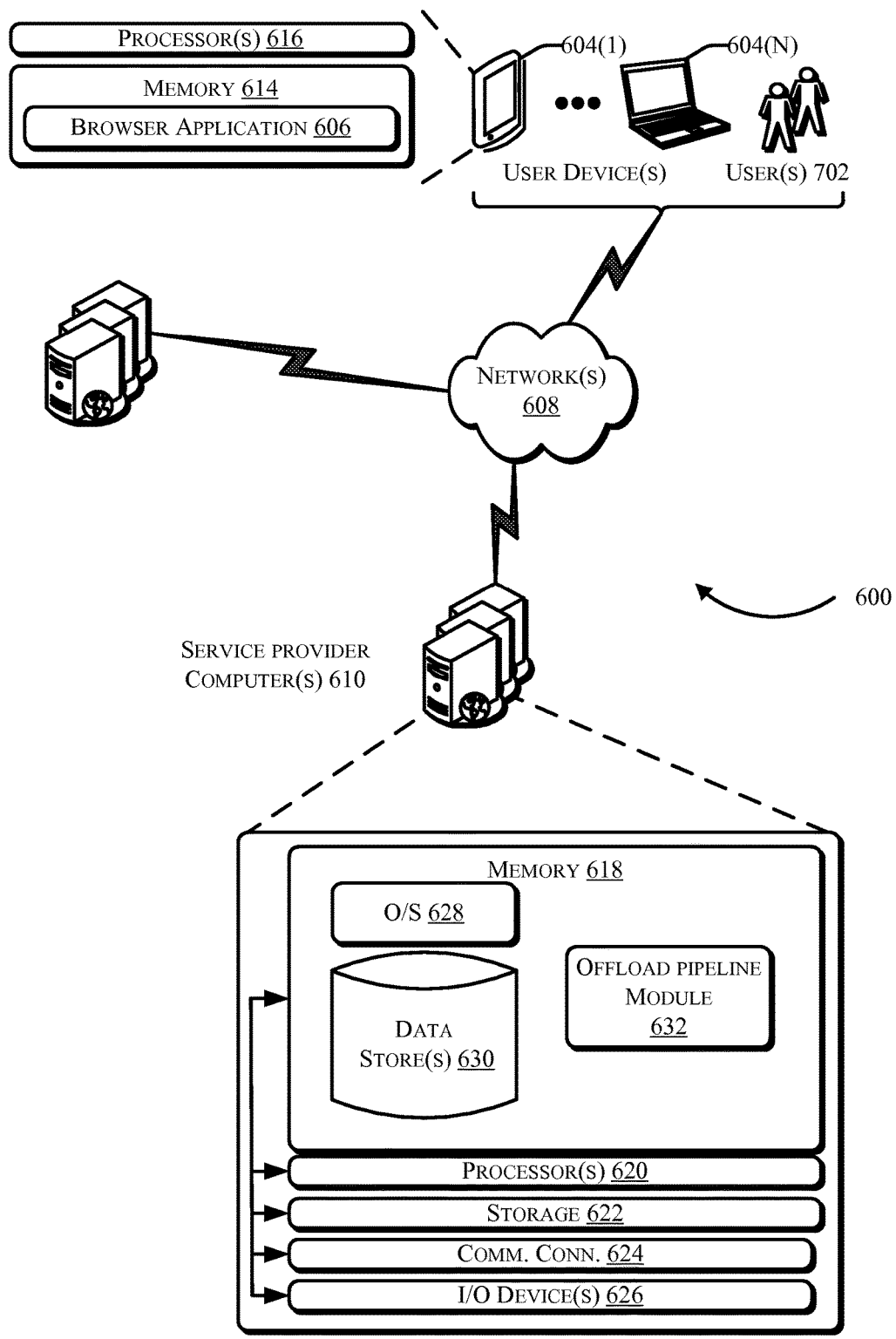
FIG. 6 illustrates an exemplary architecture for features and systems described herein that includes one or more service provider computers and/or a user device connected via one or more networks, according to at least one exemplary embodiment.

FIG. 6 illustrates an exemplary architecture for features and systems described herein that includes one or more service provider computers and/or a user device connected via one or more networks, according to at least one exemplary embodiment. The devices discussed in FIGS. 1-4, may use one or more components of the computing devices described in FIG. 6 or may represent one or more computing devices described in FIG. 6. In architecture 600, one or more users 602 may utilize user computing devices 604(1)-(N) (collectively, user devices 604) to access application 606 (e.g., a web browser or mobile device application), via one or more networks 608. In some aspects, application 606 may be hosted, managed and/or provided by a computing resources service or service provider. One or more service provider computers 610 may provide a native application which is configured to run on user devices 604 which user(s) 602 may interact with. Service provider computer(s) 610 may, in some examples, provide computing resources such as, but not limited to, client entities, low latency data storage, durable data storage, data access, management, virtualization, cloud-based software solutions, electronic content performance management, etc. Service provider computer(s) 610 may also be operable to provide web hosting, computer application development and/or implementation platforms, combinations of the foregoing or the like to user(s) 602. Service provider computer(s) 610, in some examples, may communicate with one or more third party computers 612.

In some examples, network(s) 608 may include any one or a combination of many different types of networks, such as cable networks, the Internet, wireless networks, cellular networks and other private and/or public networks. While the illustrated example represents user(s) 602 accessing application 606 over network(s) 608, the described techniques may equally apply in instances where user(s) 602 interact with service provider computer(s) 610 via user device(s) 604 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 606 may allow user(s) 602 to interact with service provider computer(s) 610 such as to access web content (e.g., web pages, music, video, etc.). Service provider computer(s) 610, perhaps arranged in a cluster of servers or as a server farm, may host application 606 and/or cloud-based software services. Other server architectures may also be used to host application 606. Application 606 may be capable of handling requests from many users 602 and serving, in response, various item web pages. Application 606 can provide any type of website that supports user interaction, including social networking sites, online retailers, informational sites, blog sites, search engine sites, news and entertainment sites and so forth. As discussed above, the described techniques can similarly be implemented outside of application 606, such as with other applications running on user device(s)1404.

User device(s) 604 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 604 may be in communication with service provider computer(s) 610 via network(s) 608, or via other network connections. Additionally, user device(s) 604 may be part of the distributed system managed by, controlled by or otherwise part of service provider computer(s) 610 (e.g., a console device integrated with service provider computers 610).

In one illustrative configuration, user device(s) 604 may include at least one memory 614 and one or more processing units (or processor(s)) 616. Processor(s) 616 may be implemented as appropriate in hardware, computer-executable instructions, firmware, or combinations thereof. Computer-executable instruction or firmware implementations of processor(s) 616 may include computer-executable or machine-executable instructions written in any suitable programming language to perform the various functions described. User device(s) 604 may also include geo-location devices (e.g., a global positioning system (GPS) device or the like) for providing and/or recording geographic location information associated with user device(s) 604.

Memory 614 may store program instructions that are loadable and executable on processor(s) 616, as well as data generated during the execution of these programs. Depending on the configuration and type of user device(s) 604, memory 614 may be volatile (such as random access memory (RAM)) and/or non-volatile (such as read-only memory (ROM), flash memory, etc.). User device(s) 604 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 614 may include multiple different types of memory, such as static random access memory (SRAM), dynamic random access memory (DRAM), or ROM.

Turning to the contents of memory 614 in more detail, memory 614 may include an operating system and one or more application programs or services for implementing the features disclosed herein including at least a user provided input element or electronic service web page, such as via browser application 606 or dedicated applications (e.g., smart phone applications, tablet applications, etc.). Browser application 606 may be configured to receive, store and/or display a website or other interface for interacting with service provider computer(s) 610. Additionally, memory 614 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 604.

In some aspects, service provider computer(s) 610 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 610 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 610 may be in communication with user device(s) 604 and/or other service providers via network(s) 608, or via other network connections. Service provider computer(s) 610 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 610 may include at least one memory 618 and one or more processing units (or processor(s)) 620. Processor(s) 620 may be implemented as appropriate in hardware, computer-executable instructions, firmware or combinations thereof. Computer-executable instruction or firmware implementations of processor(s) 620 may include computer-executable or machine-executable instructions written in any suitable programming language to perform the various functions described.

In some instances, hardware processor(s) 620 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 618 may store program instructions that are loadable and executable on processor(s) 620, as well as data generated during the execution of these programs. Depending on the configuration and type of service provider computer(s) 610, memory 618 may be volatile (such as RAM) and/or non-volatile (such as ROM, flash memory, etc.). Service provider computer(s) 610 or servers may also include additional storage 622, which may include removable storage and/or non-removable storage. The additional storage 622 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 618 may include multiple different types of memory, such as SRAM, DRAM, or ROM.

Memory 618, the additional storage 622, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 618 and the additional storage 622 are all examples of computer storage media. Additional types of computer storage media that may be present in service provider computer(s) 610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 610. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 610 may also contain communications connection(s) 624 that allow service provider computer(s) 610 to communicate with a stored database, another computing device or server, user terminals and/or other devices on network(s) 608. Service provider computer(s) 610 may also include I/O device(s) 626, such as a keyboard, a mouse, a pen, a voice input device, a touch input device, a display, speakers, a printer and the like.

Memory 618 may include an operating system 628, one or more data stores 630 and/or one or more application programs or services for implementing the features disclosed herein, including optionally an offload pipeline module 632. The offload pipeline module 632 may be similar to the offload pipeline 212 as described with reference to FIG. 2. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, and/or functions described herein can be provided by one or more modules that exist as separate modules and/or module functions described herein can be spread over multiple modules.

Figure 7:
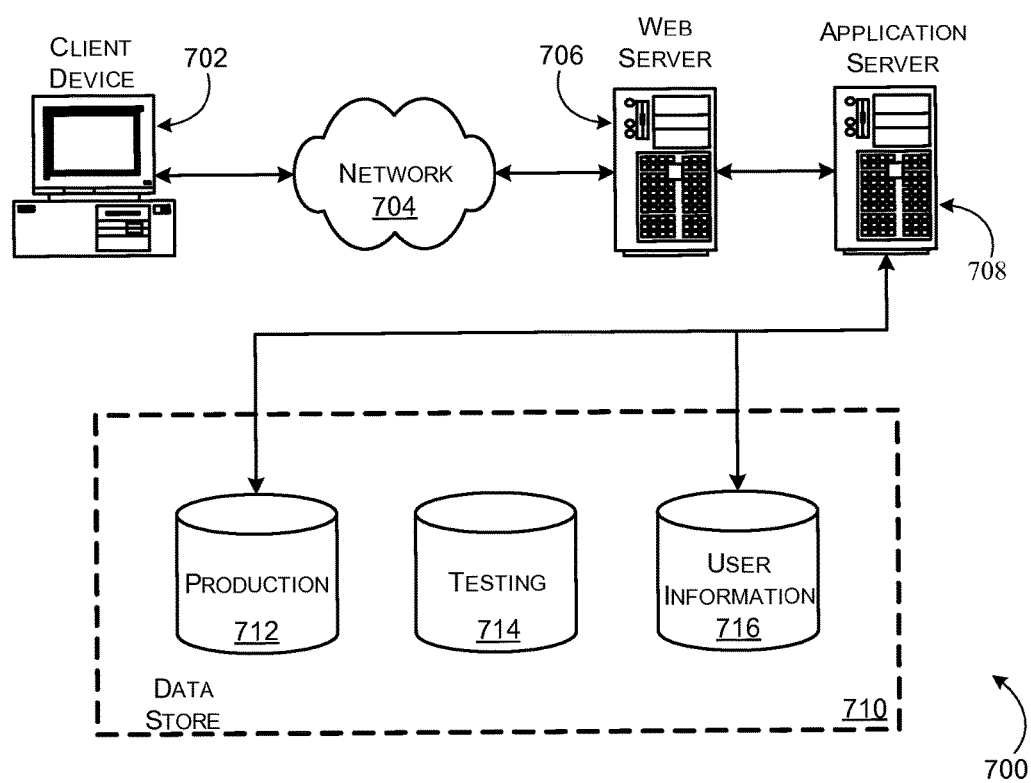
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those various embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer apparatus comprising:
   a host device comprising a host processor, wherein the host processor is configured to execute a plurality of computer-executable instructions; and
   an I/O adapter device communicatively coupled to the host device via a host interface, wherein the host device is configured to offload certain data processing to the I/O adapter device, the I/O adapter device comprising:
      a processor core, wherein the processor core is configured to execute a plurality of computer-executable instructions;
      an offload pipeline coupled to the processor core the offload pipeline configured to perform the certain data processing on behalf of the host device; and
      a network interface configured to communicate with one or more remote storage devices via one or more networks;
   wherein the I/O adapter device is configured to:
      receive a request, from the host device via the host interface, for a transaction for processing data from a source storage volume;
      identify the transaction as a type of transaction for copying the data from the source storage volume to one or more destination storage volumes;
      read the data from the source storage volume;
      process the data for generating one or more copies of the data; and
      send the one or more copies of the data for storing in the one or more destination storage volumes.

2. The computer apparatus of claim 1, wherein the computer apparatus is coupled to one or more local storage devices comprising one or more local storage volumes, wherein the source storage volume or the one or more destination storage volumes reside in the one or more local storage volumes.

3. The computer apparatus of claim 1, wherein the one or more remote storage devices comprise one or more remote storage volumes, and wherein the source storage volume or the one or more destination storage volumes reside in the one or more remote storage volumes.

4. The computer apparatus of claim 1, wherein the one or more remote storage devices comprise two or more remote storage volumes, and wherein the source storage volume and the one or more destination storage volumes reside in the two or more remote storage volumes.

5. The computer apparatus of claim 1, wherein the computer apparatus is a server computer, and wherein the server computer is communicatively coupled to a client computer via the one or more networks.

6. The computer apparatus of claim 1, wherein the computer apparatus is a client computer and wherein the request for the transaction is received from a virtual machine running on the host device of the client computer.

7. A computer apparatus comprising:
   an I/O adapter device configured to be communicatively coupled to a host device via a host interface and to a plurality of remote storage devices via one or more networks, the I/O adapter device comprising a processor core, the host device comprising a host processor, wherein the host device is configured to offload certain data processing to the I/O adapter device for the I/O adapter device to perform the certain data processing on behalf of the host device, wherein the I/O adapter device is configured to:
- receive a request, from the host device via the host interface, for a transaction for processing data from a source storage volume;
- identify the transaction as a type of transaction for processing the data from the source storage volume for storing in one or more destination storage volumes;
- read the data from the source storage volume;
- process the data for generating one or more processed data; and
- send the one or more processed data for storing in the one or more destination storage volumes.

8. The computer apparatus of claim 7, wherein the I/O adapter device comprises a data processor module configured to process the data for generating one or more copies of the data, wherein the one or more processed data includes the one or more copies of the data.

9. The computer apparatus of claim 7, wherein the I/O adapter device comprises a data processor module configured to process the data for generating snapshot data for the source storage volume, wherein the one or more processed data includes the snapshot data for storing in the one or more destination storage volumes.

10. The computer apparatus of claim 9, wherein the snapshot data includes the data from the source storage volume and meta-data associated with the data from the source storage volume at a particular point in time.

11. The computer apparatus of claim 10, wherein the meta-data includes a time stamp, a source block address for the source storage volume and a source volume identifier.

12. The computer apparatus of claim 7, wherein the computer apparatus is coupled to one or more local storage devices comprising one or more local storage volumes, wherein the source storage volume or the one or more destination storage volumes reside in the one or more local storage volumes.

13. The computer apparatus of claim 7, wherein the one or more remote storage devices comprise one or more remote storage volumes, and wherein the source storage volume or the one or more destination storage volumes reside in the plurality of remote storage volumes.

14. The computer apparatus of claim 7, wherein the computer apparatus is coupled to one or more local storage devices comprising two or more local storage volumes, wherein the source storage volume and the one or more destination storage volumes reside in the two or more local storage volumes.

15. The computer apparatus of claim 7, wherein the one or more remote storage devices comprise two or more remote storage volumes, and wherein the source storage volume and the one or more destination storage volumes reside in the plurality of remote storage volumes.

16. The computer apparatus of claim 7, wherein the I/O adapter device comprises a payload buffer and wherein the I/O adapter device is further configured to store the data in the payload buffer after reading the data from the source storage volume.

17. The computer apparatus of claim 7, wherein the request for the transaction includes a source volume identifier for the source storage volume, one or more destination volume identifiers for respective one or more destination storage volumes, a transaction type, a source block address for the source storage volume, a block size, and one or more destination block addresses for respective one or more destination storage volumes.

18. A computer implemented method, comprising:
- receiving, by an I/O adapter device comprising a processor core, a request for a transaction, from a host device coupled to the I/O adapter device via a host interface, for processing data from a source storage volume, wherein the I/O adapter device is communicatively coupled to a plurality of remote storage devices via one or more networks, wherein the host device is configured to offload certain data processing to the I/O adapter device for the I/O adapter device to perform the certain data processing on behalf of the host device;
- identifying the transaction as a type of transaction for processing the data from the source storage volume for storing in one or more destination storage volumes;
- reading the data from the source storage volume;
- processing the data for generating one or more processed data; and
- sending the one or more processed data for storing in the one or more destination storage volumes.

19. The computer implemented method of claim 18, wherein the one or more processed data includes one or more copies of the data and wherein the processing the data for generating the one or more processed data is for creating a replica of the source storage volume.

20. The computer implemented method of claim 18, wherein the one or more processed data includes one or more copies of the data and wherein the processing the data for generating the one or more processed data is for performing online migration of the data from the source storage volume to the one or more destination storage volumes.

* * * * *